Feb. 10, 1931.  A. SCOYNI  1,791,575
AEROPLANE PARACHUTE
Filed Feb. 24, 1930    3 Sheets-Sheet 1
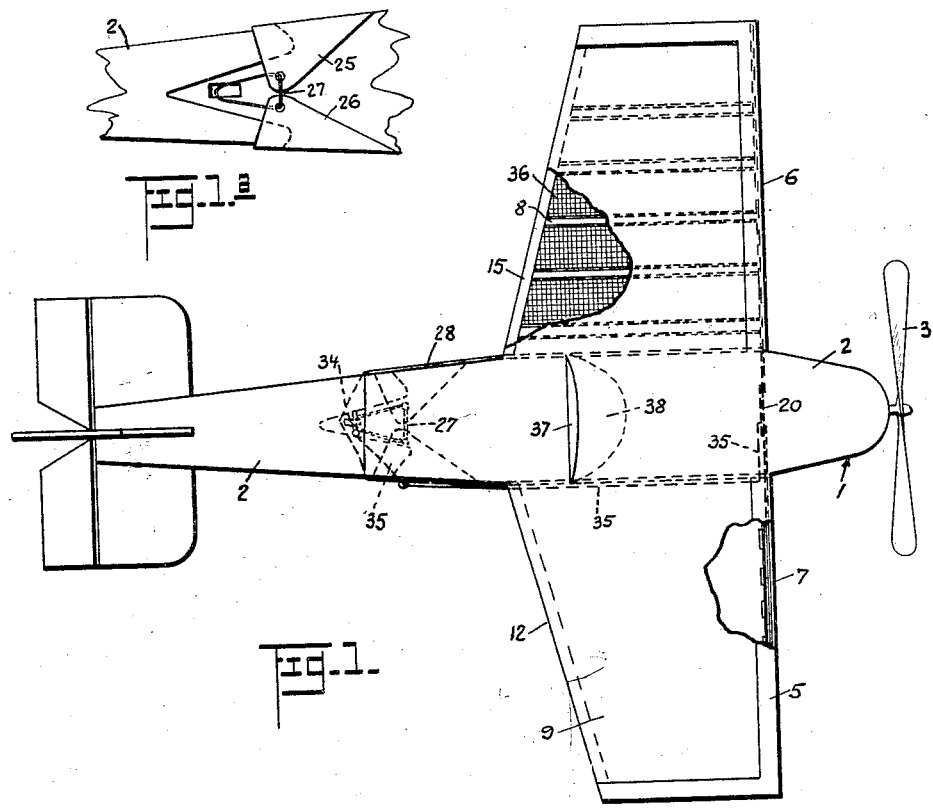
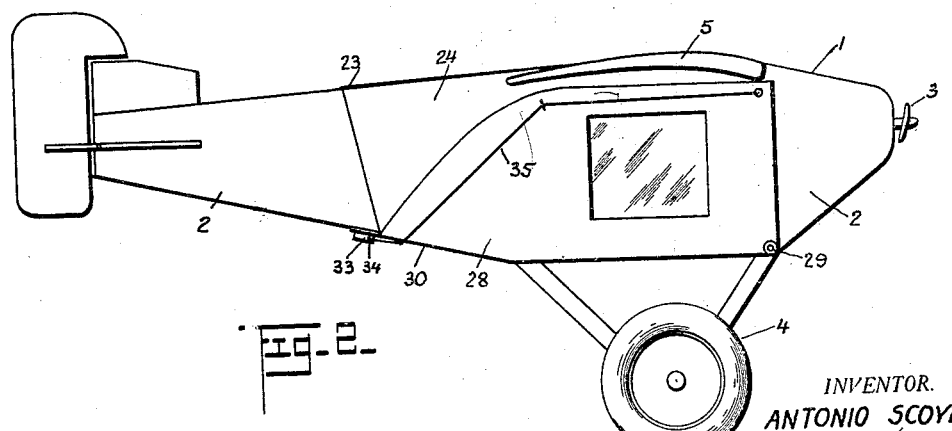
INVENTOR.
ANTONIO SCOYNI
BY
ATTORNEY.

Feb. 10, 1931. A. SCOYNI 1,791,575
AEROPLANE PARACHUTE
Filed Feb. 24, 1930 3 Sheets-Sheet 2
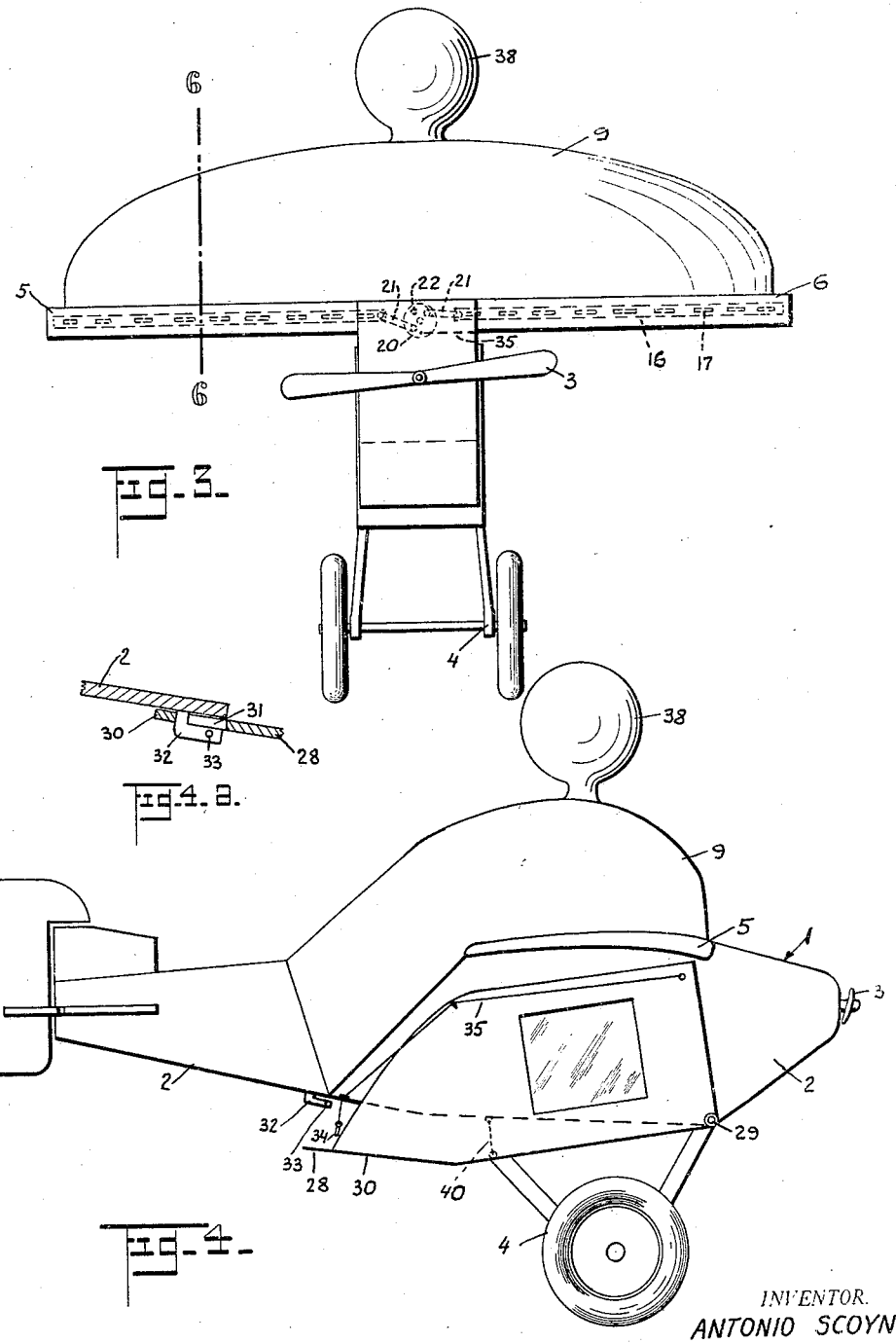
INVENTOR.
ANTONIO SCOYNI
BY
ATTORNEY.

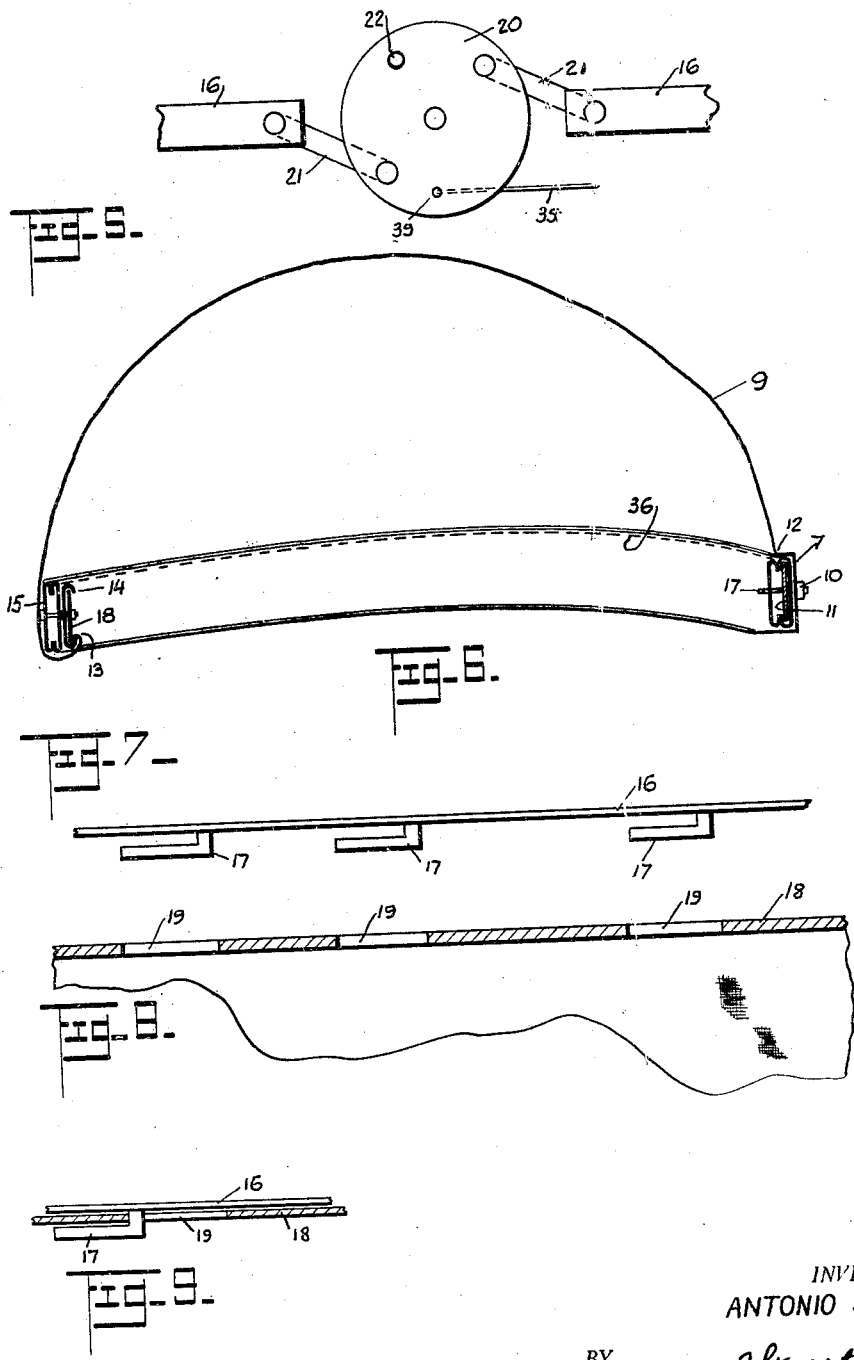

Patented Feb. 10, 1931

1,791,575

UNITED STATES PATENT OFFICE

ANTONIO SCOYNI, OF NEW YORK, N. Y.

AEROPLANE PARACHUTE

Application filed February 24, 1930. Serial No. 431,028.

This invention relates to improvements in means for sustaining an aeroplane in the air when the engine goes dead.

The object of this invention, is to provide a parachute attached to the aeroplane and adapted to operate at the will of the pilot.

A further object of this invention, is to provide an aeroplane with wings and a parachute enfolding the wings, said parachute being operative from a device within the cabin of the aeroplane.

A further object of this invention is to provide an aeroplane with wings, said wings being covered with material which could be extended so as to function as a parachute for the aeroplane.

A further object of this invention is to provide an aeroplane with wings, said wings being covered with material which could be extended so as to function as a parachute said material is also slotted at its mid-point, and a balloon attached to the material and adapted to be folded into said slot.

Other objects and advantages will appear in the following specification, and the novel features of the invention will be particularly pointed out in the appended claims.

My invention is illustrated in the accompanying drawing forming part of this application, and in which:—

Figure 1 is a plan view partly in section of the aeroplane.

Figure 1A is a bottom view of a portion of the aeroplane.

Figure 2 is a side view of the aeroplane.

Figure 3 is a front view of the aeroplane with parachute in operation.

Figure 4 is a side view with parachute in operation.

Figure 4A is a detail showing the locking means of outer cabin to fuselage.

Figure 5 is a detail for operating the connecting members.

Figure 6 is a view taken on 6—6 of Figure 3.

Figure 7 is a detail view of one of the connecting members.

Figure 8 is a detail of the other connecting members.

Figure 9 is a detail view showing the connecting members in locked position.

Referring now to the drawings the numeral 1, represents an aeroplane having a fuselage 2, propeller 3, landing gear 4.

The wings 5, and 6 are especially constructed and consists of a longitudinal frame 7, and cross frames 8.

The wings 5 and 6 and a portion of the plane are covered with a layer of fabric or ship canvas 9. The canvas 9 is held fast in the longitudinal frame 7, by means of bolts 10, in threaded relation with plate 11. The canvas 9 is turned at the edge 12 and extends underneath the wing until it meets the longitudinal frame 7.

The end 13, of the canvas 9 is held in a movable member 14, which travels between the longitudinal frame 7, and frame 15 opposite to frame 7.

On frame 7, there is attached a bar 16 with hooks 17, and on the movable member 14 there is attached a plate 18 with openings 19. When the canvas underneath the plane is spread out the hooks 17 are in engagement with the openings 19 of the plate 18, as shown in Figure 9.

It should be noted that the canvas 9 is held very tight on the bottom of the wing and when the hook 17, is released from the slot 19, of the bar 18 the strong air currents will immediately pull the bar 18 towards the frame 15 and thus open the canvas over the wing into a parachute. Other means for forcing the bar 18 towards the frame 15 may be employed.

The bars 16, in each wing 5, and 6, are controlled by a wheel 20 which connects the bars 16, by means of links 21. The wheel 20 is set in the cabin of the plane and operated by the pilot through the handle 22.

The canvas 9, also covers a part of the plane and extends over the cabin 2, until near the tail 23. The rear portion of the canvas is turned down as at 24, and folded underneath the plane as shown in Figure 1A. The folded ends 25 and 26 are held together by means which will be explained later.

On the outside of the fuselage or cabin 2 there is provided an outer movable cabin 28, which revolves on a pin 29. The bottom 30, of the outer cabin 28, terminates in a point and is provided with a slot 31.

The bottom of the fuselage 2, is provided with a hook member 32, and a perforation 33, which engages the slot 31, of the bottom 30. The bottom 30, is held in place by means of a pin 34, inserted into the perforation 33, and held by a wire 35, arranged to operate from the wheel 20, in the cabin 2. The pin 34 is also adapted to hold the wire 27 before it enters the perforation 33.

The wings are reinforced by a wire screen 36.

The upper portion of the canvas is provided with a slot 37. To the edge of the slot there is attached by sewing or otherwise a balloon 38, which when not in use folds into the pocket formed by the slot 37.

In operation when for any reason the engine goes dead or out of order the pilot operates the handle 22, on the wheel 20, so as to move the bars 16. When the bars 16 are moved so that the hooks 17 move out of engagement from the plate 18 the wind will move the lower canvas from beneath wings towards the bar 15, this will increase the amount of canvas over the wings.

At the same time that the wheel 20 is turned the wire 35, which is attached to the wheel 20 at 39 is moved and pulls out the pin 34 from the perforation 33, this action releases the wire 27 and at same time the outer cabin 28, drops a short distance limited by the chain 40 which is attached to the inner cabin.

The last action releases the held down canvas which with the inrush of wind caused by the falling plane opens up the canvas to form a parachute as shown in Figure 4.

During the descent of the plane the air current finds its way to force out the balloon shown in Figure 4. This extra precaution serves to steady the plane in its descent.

As many changes could be made in the above construction and many apparently widely different embodiments of this invention could be made without departing from the scope thereof, it is intended that all matter contained in the above description or shown in the accompanying drawing, shall be interpreted as an illustrative and not in a limiting sense.

It is also to be understood that the language used in the following claims is intended to cover all of the generic and specific features of the invention herein described.

Having thus described my invention, what I claim as new, and desire to protect by Letters Patent, is:

1. In an aeroplane having wings, a fuselage a cover for top and bottom of said wings and fuselage, said cover draping down the side of the fuselage and held by means at the bottom of the fuselage, a single control to release the cover from the bottom of wing end at same time drop the outer cabin so as to release the cover held at the bottom of the fuselage.

2. In an aeroplane having wings, a fuselage a cover for top and bottom of said wings and fuselage, said cover draping down the side of the fuselage and held by means at the bottom of the fuselage, a single control to release the cover from the bottom of wing end at same time drop the outer cabin so as to release the cover held at the bottom of the fuselage, and an additional balloon attached to the center of the cover which becomes inflated as the aeroplane descends.

Signed at New York in the county of New York and State of New York this 25th day of January, A. D. 1930.

ANTONIO SCOYNI.